US006362296B1

(12) United States Patent
Singhal et al.

(10) Patent No.: US 6,362,296 B1
(45) Date of Patent: Mar. 26, 2002

(54) CONTINUOUS BULK POLYMERIZATION PROCESS

(75) Inventors: Shruti Singhal, Villanova, PA (US); Rainer Hoefer, Neuss (DE); John E. Nowicki, Hatfield, PA (US); George Roth, Homewood, IL (US); Darmesh Chovatia, Bensalem; Shailesh Shah, Dresher, both of PA (US)

(73) Assignee: Cognis Corporation, Gulph Mills, PA (US)

( * ) Notice: Subject to any disclaimer, the term of this patent is extended or adjusted under 35 U.S.C. 154(b) by 0 days.

(21) Appl. No.: 09/183,229

(22) Filed: Oct. 30, 1998

Related U.S. Application Data

(60) Provisional application No. 60/063,810, filed on Oct. 31, 1997.

(51) Int. Cl.⁷ ............................................... C08J 220/10

(52) U.S. Cl. ................. 526/318.44; 526/68; 526/317.1; 526/320; 526/318

(58) Field of Search ....................... 526/320, 68, 317.1, 526/329.2, 318.44, 64, 65, 67, 82, 84, 87, 88, 318.4, 318.6

(56) References Cited

U.S. PATENT DOCUMENTS

| | | | |
|---|---|---|---|
| 2,769,804 A | 11/1956 | Hanosn | 260/86.7 |
| 2,989,517 A | 6/1961 | Hanson | 260/93.5 |
| 3,509,110 A | 4/1970 | DiGiulio | 260/78.5 |
| 3,520,861 A | 7/1970 | Thomson | 260/88.1 |
| 3,620,930 A | 11/1971 | Tshcopp et al. | 203/87 |
| 3,719,722 A | 3/1973 | Tschopp et al. | 260/680 D |
| 3,821,330 A | 6/1974 | Free | 260/885 |
| 3,859,268 A | 1/1975 | Novack | 260/88.2 |
| 3,903,200 A | 9/1975 | Cincera et al. | 260/876 R |
| 3,909,207 A | 9/1975 | Bir | 23/285 |
| 3,928,495 A | 12/1975 | Dalton | 260/876 R |
| 3,931,356 A | 1/1976 | Dalton | 260/876 R |
| 3,935,148 A | 1/1976 | Childers et al. | 260/29.6 XA |
| 3,953,301 A | 4/1976 | Mendez et al. | 203/75 |
| 3,957,912 A | 5/1976 | Cincera | 260/880 R |
| 3,979,352 A | 9/1976 | Brady et al. | 260/33.4 R |
| 4,110,521 A | 8/1978 | Barnett et al. | 526/64 |
| 4,187,260 A | 2/1980 | Kruse et al. | 525/263 |
| 4,209,599 A | 6/1980 | Brady et al. | 526/64 |

(List continued on next page.)

FOREIGN PATENT DOCUMENTS

| | | |
|---|---|---|
| DE | 0100444 | 6/1930 |
| DE | 2461164 | 6/1976 |
| DE | 2947622 | 6/1980 |
| DE | 4019788 | 1/1992 |
| EP | 068024 A | 3/1983 |
| EP | 0457355 | 9/1995 |
| GB | 1107249 | 3/1968 |
| GB | 1560870 | 2/1980 |

OTHER PUBLICATIONS

Arzamendi et al., Semicontinuous Emulsion Copolymerization of Methyl Methacrylate and Ethyl Acrylate, *Journal of Polymer Science Part A: Polymer Chemistry*, vol. 29, pp. 1549–1559 (1991).

Arzamendi et al., "Copolymer Composition Control of Emulsion Copolymers in Reactors with Limited Capacity for Heat Removal", Ind. Eng. Chem. Res. 1991, 30, pp. 1342–1350, *American Chemical Society*, 1991.

Van Doremaele et al., "Copolymer Composition Control by Means of Semicontinuous Emulsion Copolymerization", *Journal of Applied Polymer Science*, vol. 45, 957–966 (1992).

K.R. Geddes, "The Loop Reactor Process", *Surface Coating International (JOCC)*, vol. 76, No. 8, Aug. 1993.

K. Hosogai and M. Tanaka, Niigata University, Study of Suspension Polymerization of Styrene with a Circular Loop, *Polymer Engineering and Science*, 32(6), 1992, pp. 431–437.

D. N. Butala, W. R. Liang, and K. Y. Choi, "Multiobjective Dynamic Optimization of Batch Free Radical Polymerization Process Catalyzed by Mixed Initiator Systems", *Journal of Applied Polymer Science*, vol. 44, 1759–1778.

F. A. Streiff, Sulzer Chemtech Ltd., and J.A. Rogers, Koch Engineering Company, Inc., "Don't Overlook Staticmixer Reactors", *Feature Report*, 1994.

Akli Iabbadene and Pierre Bataille, Emulsion Polmerization of Vinyl Acetate in a Tubular Loop Reactor, *Journal of Applied Polymer Science*, vol. 51, 503–511 (1994).

Won Jung Yoon and KYU Yong Choi, "Polymerization of Styrene in a Continuous Filled Tubular Reactor", *Polymer Engineering and Science*, Mid–Jan., 1996, vol. 36, No. 1.

(List continued on next page.)

*Primary Examiner*—David W. Wu
*Assistant Examiner*—Tanya Zalukaeva
(74) *Attorney, Agent, or Firm*—John E. Drach; Garrett V. Davis

(57) ABSTRACT

The invention relates to a process for producing a polymer or copolymer from monomer material comprising an acrylate, methacrylate, or mixture of such monomers, which comprises the steps of: (a) charging into a continuous tube reactor a feedstock comprising said monomer material and a polymerization initiator; (b) maintaining a flow rate of said material through the reactor at a reaction temperature in the reactor and under pressure sufficient to provide a residence time of the feedstock in the reactor during which polymerization will occur, to form a resin product in the reactor, and said resulting resin product comprising unreacted monomer, and (c) devolatilizing said resin product exiting the reactor to remove unreacted monomers, to provide a substantially monomer-free resin product. Further, the invention relates to resin product made by the process. In particular, the invention relates to resin that has a weight average molecular weight of 10,000 or less, and a glass transition temperature of less than 0° C., preferably –20° C. or lower. The resin product of the invention is particularly useful as an additive for coating and casting resin systems.

26 Claims, No Drawings

U.S. PATENT DOCUMENTS

| | | | | |
|---|---|---|---|---|
| 4,287,317 | A | * 9/1981 | Kitagawa et al. | 525/309 |
| 4,311,851 | A | 1/1982 | Jung et al. | 560/223 |
| 4,409,286 | A | 10/1983 | Decroix | 428/332 |
| 4,410,673 | A | 10/1983 | Schulz et al. | 526/202 |
| 4,414,370 | A | 11/1983 | Hamielec et al. | 526/88 |
| 4,452,751 | A | 6/1984 | McCullough et al. | 264/45 |
| 4,515,907 | A | 5/1985 | McCullough et al. | 521/139 |
| 4,526,946 | A | 7/1985 | Fitzpatrick et al. | 526/202 |
| 4,529,787 | A | 7/1985 | Schmidt et al. | 526/317 |
| 4,542,196 | A | 9/1985 | Morris et al. | 526/64 |
| 4,546,160 | A | 10/1985 | Brand et al. | 526/320 |
| 4,548,788 | A | 10/1985 | Morris et al. | 422/109 |
| 4,550,149 | A | 10/1985 | Morris et al. | 526/68 |
| 4,551,309 | A | 11/1985 | Morris et al. | 422/135 |
| 4,551,510 | A | 11/1985 | Morris et al. | 526/68 |
| 4,555,384 | A | 11/1985 | Morris et al. | 422/109 |
| 4,579,918 | A | 4/1986 | Metzger et al. | 526/64 |
| 4,599,430 | A | 7/1986 | Milberger et al. | 548/548 |
| 4,677,171 | A | 6/1987 | Morris et al. | 526/68 |
| 4,713,434 | A | 12/1987 | Sutterlin et al. | 526/62 |
| 4,732,953 | A | 3/1988 | Carroll, Jr. et al. | 526/88 |
| 4,732,954 | A | 3/1988 | Carroll, Jr. et al. | 526/88 |
| 4,775,742 | A | 10/1988 | Fitzpatrick | 528/486 |
| 4,839,093 | A | 6/1989 | Wenmaekers | 252/314 |
| 4,871,591 | A | * 10/1989 | Sugimura et al. | 427/388.5 |
| 4,933,484 | A | 6/1990 | Gujarathi et al. | 558/463 |
| 4,946,891 | A | 8/1990 | Devona et al. | 524/833 |
| 4,948,847 | A | 8/1990 | Morita et al. | 526/64 |
| 4,981,759 | A | * 1/1991 | Nakatani et al. | 428/626 |
| 4,988,781 | A | 1/1991 | McKinney et al. | 526/68 |
| 5,037,864 | A | 8/1991 | Anand et al. | 523/348 |
| 5,194,525 | A | 3/1993 | Miura et al. | 526/64 |
| 5,376,740 | A | * 12/1994 | Pfleger et al. | 526/64 |
| 6,037,416 | A | * 3/2000 | Iwamoto et al. | 525/207 |

OTHER PUBLICATIONS

J. Meuldijk, et al., Eindhoven University of Technology, "A Novel Reactor for Continuous Emulsion Polymerization", *Chemical Engineering Secience*, 37(9–11), 1992, pp. 2603–2608.

M. Atiqullah, M. M. Hassan, and S. A. Beg, *Journal of Applied Polymer Science*, vol. 46, 879–889 (1992), Modeling the Effects of Micromixing and Start–Up Procedures on Bulk Copolymerization and Copolymer in a Tubular Reactor.

Latinen, Devolatilization of Viscous Polymer Systems, *ADV in Chemistry Series 34*, ACS, 1962, pp. 235–246.

Morgan, Styrene/Acrylic Acid Emulsion Copolymers: The Effect of Process Variables on Homogeneity, Makromol. Chem. Suppl. 10/11. 59–67 (1985).

Kahn, The Loop Continuous Process (Leprocédé Continu Enboucle), *EuroCoat* May 1991, p. 307–312.

* cited by examiner

CONTINUOUS BULK POLYMERIZATION PROCESS

This application claims priority of a provisional application, U.S. Ser. No. 60/063,810, filed Oct. 31, 1997, which is incorporated herein by reference.

FIELD OF THE INVENTION

The invention relates to a continuous bulk polymerization process for making acrylate polymers suitable for use as flow control additives in systems which are used in the making of thermoset coated substrates, particularly for coating and casting resins, more particularly for powder coating systems, as well as casting resins for potting and flooring applications curing at ambient temperature. Such acrylate polymers can be solvent-free or substantially solvent-free and substantially free of unreacted monomer. In a particular embodiment, the invention relates to a process for making poly(butylacrylate-co-2-ethylhexylacrylate) resins with a low weight average molecular weight, which are suitable for use as flow control additives.

BACKGROUND OF THE INVENTION

Flow modifiers (i.e. flow control additives) perform many functions in a coating. Flow additives are essential ingredients of many organic resin systems for coating and casting applications. They are described in, for example, L. J. Calbo, Ed., Handbook of Coating additives, Vol. 1, p. 119 et seq., Marcel Decker, New York (1987) and in U. Zorll, Ed., ROEMPP-Lexikon—Lacke und Druckfarben, p. 602 et seq., Georg Thieme Verll, Stuttgart (1998). They are primarily used to reduce or eliminate surface defects, such as craters, fisheyes, orange peel and pinholes. This is achieved by enhancing the wet-out, flow and leveling of the uncured film. Most of the surface defects develop during the application of the coating material on the substrate.

Surface cratering results from insufficient wetting of the substrate by the wet or molten coating material. In order to achieve good wetting, a liquid coating must have a surface tension equal to or lower than that of the substrate. High solids coating systems, such as oil-free polyester/melamines, wet poorly due to the high surface tension of the resins and the use of polar solvents. Cratering also results from contamination of the substrate or the wet film with low surface tension material, such as silicones, greasy dust, or solvent droplets.

The driving force behind the formation of a crater is the flow of material from areas of low surface tension to areas of higher surface tension. Flow modifiers exhibit a surface tension much lower than the resin vehicles, promoting substrate wetting. The polymer structure of the flow modifier defines its surface activity and controls or limits the compatibility of the product in a coating.

Historically speaking, during the latter portion of the 1950s thermoset-type powder coating materials were introduced and used to coat metallic substrates. They generally consisted of a simple epoxy material. The end product was considered a functional, not a decorative, coating. Thermoset-type materials are materials that, when applied to a substrate and heated to a curing temperature, melt, flow and then cross-link chemically. Once cured, this material, if reheated, will not remelt or reflow. As time went by, thermoset-type coatings were applied to substrates to provide both protection and decorative appeal. Surface defects in thermoset coatings were to be avoided not only because they detracted from the appearance of the coatings but also because they could compromise the integrity of the substrate. Early on the presence of solvents in epoxy powder coating systems helped avoid surface defects.

Epoxy coating systems can be liquid systems or in other cases can be powder systems. Epoxy powder coating systems are generally made in a three-stage continuous process as follows. In the first stage, epoxy resins, argumented with other resin, preservatives, dyes, pigments, curing agent and so forth are dry-mixed in a blender. The blended material is then fed into a kneader. Because of the tremendous mechanical energy released inside the kneader, any solid resins quickly melt. Molten material which is extruded from the kneader is then cooled and subsequently pulverized.

Recent advances in coating technology have included the development of high solids, low volatile organic compound (VOC) coating systems and of powder coating systems. The low VOC content (i.e. solvent content) reduces the ability of the coating system to overcome poor wetting and flow at the time when the coating system is heated and cured. Further, vehicles (i.e. thinners) which have been developed for these coatings systems often exhibit poor wetting and flow characteristics, increasing the frequency of surface defects. These trends have resulted in a greater reliance on flow modifiers such as polyacrylates to provide better flow and leveling qualities.

Copolymerized acrylate resins such as poly(butylacrylate-co-2-ethylhexylacrylate) resins have been used as flow control agents for epoxy coating systems. These prior art polyacrylate resins are available in the marketplace. For example, these polyacrylate resins are available from Monsanto, The Chemical Group, 800 N. Lindbergh Boulevard, St. Louis, Mo. 63167 and are sold under trademarks such as Modaflow®, and Modaflow® 2100. Other such resins are available from Henkel KgaA, Duesseldorf, Germany, or from Henkel Corporation, Ambler, Pa., under the marks Perenol® F40, Perenol® F45, and Perenol®F30P. However, prior art polyacrylate resins have weight average molecular weights in range of 10,000–30,000, which means they are quite viscous and therefore tend to inhibit the flow of coatings systems containing them, sometimes requiring the use of high boiling, diluting carrier oils. This is particularly true if the epoxy coating systems themselves are liquid and are innately thick and/or lack clarity. Also, some of these prior art polyacrylate flow control resins often contain solvents such as xylene which are classified as volatile organic compounds (VOC's). Such resins when thermoset in ovens generate fumes of VOC's that are hazardous to work with.

SUMMARY OF THE INVENTION

All quantities stated below, except in the Examples, are to be considered modified by "about". Unless otherwise stated all parts are by weight.

The invention relates to a bulk polymerization process as described in U.S. patent application Ser. No. 08/948,714 filed Oct. 10, 1997, which is a continuation-in-part of U.S. patent application Ser. No. 08/686,860 filed Jul. 26, 1996, both of which applications are incorporated herein by reference. The process comprises the steps of: charging into a continuous tube reactor (CTR) a feedstock of at least one vinylic monomer and a polymerization initiator; maintaining a flow rate through the reactor sufficient to provide a residence time of the feedstock in the reactor of from about one minute to about one hour; while maintaining a pressure in the tube reactor of about 80 psig to about 500 psig and while maintaining the temperature of the resin mixture that forms in the tube reactor, preferably with a heat transfer medium within the range from about 150° C. to about 260° C.; and then devolatilizing the resin product which exits the reactor to thereby remove unreacted monomers and any other volatiles. An additional embodiment comprises the additional step of recycling the unreacted monomers recovered during the devolatilization step and charging them into the continuous tube reactor as a fraction of the feedstock.

Generally, the invention relates to a process for producing a polymer or copolymer from monomer material comprising an acrylate, methacrylate, or mixture of such monomers, which comprises the steps of:

(a) charging into a continuous tube reactor a feedstock comprising said monomer material and a polymerization initiator;

(b) maintaining a flow rate of said material through the reactor at a reaction temperature in the reactor and under pressure sufficient to provide a residence time of the feedstock in the reactor during which polymerization will occur, to form a resin product in the reactor, and said resulting resin product comprising unreacted monomer, and (c) devolatilizing said resin product exiting the reactor to remove unreacted monomers, to provide a substantially monomer-free resin product. Further, the invention relates to resin product made by the above process. In particular, the invention relates to resin that has a weight average molecular weight of 10,000 or less, and a glass transition temperature of less than 0° C., preferably −20° C. or lower.

The invention further relates to using the bulk polymerization process for preparing poly(butylacrylate-co-2-ethylhexylacrylate), and comprises the steps of:

(a) charging into a continuous tube reactor, feedstock comprising butylacrylate, 2-ethylhexyl acrylate, and a polymerization initiator;

(b) maintaining a flow rate through the reactor sufficient to provide a residence time of the feedstock in the reactor of from about 2 min. to about 10 min.;

(c) maintaining a reactor pressure of about 80 psig to about 200 psig;

(d) maintaining the resulting resin at a temperature within the range from about 100° C. to about 300° C., preferably with a heat transfer medium, to form a resin product comprising poly(butylacrylate-co-2-ethylhexylacrylate) and unreacted monomer; and (e) devolatilizing the resin product exiting the reactor to remove unreacted monomers to provide a poly (butylacrylate-co-2-ethylhexylacrylate) resin product, whereby said resin is capable of forming clear coatings when used in combination with epoxy coating compositions.

The process further comprises the use of ditertiary butyl peroxide or ditertiary amyl peroxide or tert-butyl hydroxperoxide as the polymerization initiator.

In another embodiment, the bulk polymerization process further comprises an additional step of recycling the unreacted monomers recovered during the devolatilization step and charging them into the continuous tube reactor as a part of the feedstock.

Another embodiment of the invention relates to the product produced by the inventive process. Yet another embodiment the invention relates to coated articles of manufacture made using the products of the invention.

Other embodiments relate to the preparation and use of solvent-free poly(butylacrylate-co-2-ethyl hexylacrylate).

It is contemplated that the resin products of the invention may be used as flow modulators for liquid coating systems based on epoxy, urethane, acrylic, alkyd, phenolic, polyester, melamine, polyamide, silicone rubber, alkyl, EVA copolymers, and cellulosic resins. It is contemplated that the resins of the invention may be used as modifiers for powder coating systems such as epoxy, hybrid, acrylic, polyester TGIC, polyester urethane, and polyester hydroxyl alkyl amide coating systems, particularly cycloaliphatic cured liquid epoxy resin coating systems.

DETAILED DESCRIPTION OF THE INVENTION

In the process of the invention, monomers are polymerized using a single-pass flow-through tubular reactor. A monomer or a monomer blend and a polymerization initiator blend are separately introduced and then combined via stainless steel tubing. Prior to combination, the monomer or monomer blend may be preheated by pumping it through a preheating section of tubing which is dipped into an oil bath set for a preselected temperature. The preheating ensures that the temperature of the monomer blend will be increased to a desired initiation temperature level prior to entering the tubular reactor. The preheating step is not essential to the process. The combined flows then enter a static mixer where the two streams are homogeneously mixed. At this point, a small amount of interaction may occur if the monomer blend is preheated.

After exiting the static mixer, the combined flows enter a tubular reactor. The reactor consists of a single tube or a series of tubes of increasing diameter bound in a coil, for single pass use. The tubes are plain with no static mixer or other mixing elements therein or in combination therewith after the combined flows enter the tubular reactor, although the reactor tubes can be provided with static or other mixing elements as well. The coil is preferably immersed in a circulating oil bath that is maintained at a preset desired temperature. Temperature sensors placed along the length of the tubular reactor may be provided to monitor the temperature. Initiation and polymerization begin as the combined flows enter the tubular reactor. Conversion is high and the reaction is essentially complete. Unexpectedly, the single-pass flow-through tubular reactor will efficiently accomplish the desired result under the stated conditions.

A particular reactor that may be used is constructed of five 20 foot lengths of ½ inch outside diameter (O.D.) tube, three lengths of 20 foot ¾ inch O.D. tube, and two lengths of 1 inch O.D. tube, all 18 gauge 316 stainless steel. They are joined in series and preferably are contained in a shell that is 21 feet long and 8 inches in diameter which contains recirculating hot oil as the heat transfer medium.

The reactor's design details are not particularly critical, and the reactor size can be scaled up or down within limits. Laboratory scale reactors will work. However, the back pressure of the reactor is sensitive to the tube diameter, length and roughness, the number and radii of the connections as well as to the changing rheological properties of the reaction mixture as it is converted to polymer as it travels the length of the tubing. These are computationally intractable and the optimal pressure control for each reactor design must be developed experimentally as the conversion rate, as will be seen, is a strong function of the pressure in a continuous tube reactor (CTR). The minimum pressure, which is about 80 psig, should be higher than the vapor pressure of the monomer material at the heating oil temperature. The maximum pressure will depend on the hoop strength of the tubing used. The upper pressure limit will also be determined by economics and by heat transfer factors. It may be reasonable to expect this maximum pressure to be about 500 psig. For the reactor described, the optimal pressure range is from about 100 psig to about 300 psig. In this range, the conversion rate can vary from 60% to 99%.

The lower bound for the reaction temperature is about 100° C. while the upper bound is about 300° C. At lower temperatures, conversion is so slow that residence times become uneconomically long and the viscosities are too high to handle. A preferred temperature range for this reactor and for the monomer/initiator mixture is from about 140° C. to about 290° C.; more preferred is about 150° C. to about 260° C.; and even more preferred is about 210° C. to about 250° C. It may reasonably be expected that a longer tube will require lower temperature for equal conversion, while larger O.D. or thicker walls might necessitate higher temperatures. When the heat transfer fluid is set to 204° C. (401° F.), the stream at the reactor exit can be as high as 288° C. (550° F.).

The residence time lower limit is about 1 minute, conversion being low. On the upper end there are diminishing returns on percent conversion as well as economic waste for needless dwell time; this upper time limit is about 1 hour. Also, polymer properties suffer at higher residence times. The preferred dwell time for this reactor is optimized simultaneously with the pressure and temperature, as described above, and is typically about 2 to 10 minutes, preferably 3 to 6 minutes, and more preferably 150 seconds to about 250 seconds.

The process of the invention can be used to make resins with a weight average molecular weight in the range of 10,000–20,000. However, preferably the resins should have a weight average molecular weight of less than 10,000, more preferably less than 8,000, and most preferably less than 5,000. The resins of the invention should have a Tg<0° C., more preferably a Tg<−20° C., and most preferably a Tg<−30° C. In general, the most desirable resins have a Tg in the range from −30° C. to −60° C.

While no solvent is required, solvent can, of course, be added.

The feedstock can comprise, for example, butyl acrylate (BA) and 2-ethylhexylacrylate (2-EHA). The composition range of BA to 2-EHA of interest is 75 wt. % to 85 wt. % BA and 15–25 wt. % 2-EHA. A preferred charge that minimizes the formation of gel sphere beads is 77.5 wt. % BA: 22.5 wt. % 2-EHA: 0.43 wt. % di-tertbutylperoxide.

Recycling of the monomers recovered from the reaction mass exiting the reactor as distillate from the devolatilization step is one useful feature of the invention. Typically, about 5 wt. % of the feedstock can consist of recycled monomer. The recycled monomer may require pre-processing such as purification.

The polymerization initiator is of the free radical type with a half-life ranging from about 1 hour to about 10 hours at about 90° C. to about 100° C. Preferred are initiators with half-lives of about 10 hours at about 100° C. Initiators of this sort may be azo-type, such as azo-bis isobutyronitrile (AIBN), 1-tert-amylazo-1-cyanocyclohexane, and 1-tert-butylazo-1-cyanocyclohexane. They may also be peroxides and hydroperoxides such as tert-butylperoctoate, tert-butylperbenzoate, cumene hydroperoxide, dicumyl peroxide, and tert-butyl hydroperoxide. Two preferred initiators are di-tert-butyl peroxide and di-tert-amyl peroxide. The quantity of initiator typically used ranges from 0.01 wt. % to 5 wt. % and preferably 0.1–1 wt. % based on total monomer. When di-tert-butyl peroxide is used it is preferred that it is at about 0.4 wt. %. An even more preferred initiator is tert-butyl hydroperoxide (tert-BHP).

When the reaction product exits the CTR, and is no longer under pressure, the hot acrylic resin will devolatilize and the end product will therefore essentially be volatile free. The cooled product can be used as a flow control additive in epoxy coating systems. The epoxy coating systems may also be augmented with preservatives, dyes, pigments, thixotropes, wetting agents and the like prior to use.

The following Examples explore variations of the reaction parameters, particularly pressure, variations on the percent conversion (one-pass yield), and the properties of the acrylic resins produced. It is desirable to have less than 3% residual monomer in the acrylic resin produced, preferably less than 1%, and most preferably less than 0.5%. If the residual monomer in the acrylic resin is too high, coating systems containing the acrylic resin may not be clear.

All percentages are weight percentages and all molecular weights are weight average molecular weights. The examples that follow relate to copolymers of butyl acetate and 2-ethylhexylacrylate. However, it is contemplated that the product of the invention may be based on a single monomer or on two or more different monomers provided that each monomer has a glass transition temperature (Tg) of less than −20° C.

It is further contemplated that the monomers may be selected from a group which includes, for example, ethyl acrylate, hydroxyethyl acrylate, 2-ethyl hexyl acrylate, hydroxyethlyl acrylate, acrylic acid, and methacrylic acid. While the examples below and previous descriptions of the invention often relate to the production of copolymers, the process of the invention is also useful for the production of homopolymers, terpolymers, etc. Acrylic monomer that include long chains having acrylic and/or methacrylic terminals are also useful, but long chains are not preferred for use in coating compositions.

EXAMPLES

In the Examples, butyl acrylate (BA) and 2-ethylhexylacrylate (2-EHA), two monomers, were polymerized in the presence of a polymerization initiator, using a single pass flow through tubular reactor as described above.

In Examples 1–3 and 5–17, the polymerization initiator was di-tert butyl peroxide (di-TBP). In Example 4, a polymerization initiator was not used. In Examples 21–25, the polymerization initiator was tert-butyl hydroperoxide (tert BHP).

In a first step, the two monomers were blended. Then the blend was pumped through a section of tubing that was immersed in an oil bath set at about 260° C. (500° F.) to heat the blend as it flowed through the tubing. The heated blend, after being mixed with di-TBP or tert BHP, was flowed into the tubular reactor. The reaction product flowing out of the tubular reactor was devolatilized thereby to separate out the acrylic resin product from the volatile material in the product. The resin was then cooled. The cooled product was then available for use as a flow control modifier.

In each of the several Examples below, the resin product prepared was assigned a resin number. Details with respect to the resin products are set forth in Tables I–VII which follow.

In the Examples, all parts and percentage are by weight. In the Examples, the viscosities were measured with a Brookfield DVI+ viscometer at a temperature of 25° C. with a #27 spindle at 50 RPM.

Example 1

Production of Copolymer Resin 48-C-3-91 by the Process of the Invention

Feedstock consisting of 80 parts of BA. 20 parts 2-EHA, and 0.5 parts di-TBP at a temperature of 210° C. (410° F.), was flowed through the continuous tube reactor with a residence time in the reactor of 3.33 minutes at a pressure of 120 psi. The reaction product that flowed out of the reactor was devolatized at a strip temperature of 440° F. to produce the acrylic copolymer resin product, 48-C-3-91. Details about the making of resin 48-C-3-91 are set forth below in Table I and Table II.

A sample of resin 48C-3-91 was tested to determine its weight average molecular weight, glass transition temperature, and viscosity, and to determine the parts by weight of residual monomer in the resin. The data obtained are shown in the first line of Table III. Also reported in Table III are the physical properties of three commercially available flow control resins. The three resins are identified by Monsanto as Modaflow®, Modaflow® 2100, and Resiflo®.

As shown in Table II, resin 48-C-3-91 has a weight average molecular weight of 5200, whereas the commercially available flow control resins, with which it is compared in Table II have weight average molecular weights in the range of 10,000–30,000. Resin 48-C-3-91 should be less viscous and have flow characteristics that are closer to those of water than these prior art resins.

In order to compare flow characteristics, a sample of resin 48-C-3-91, a sample of each of two of the Monsanto resins, and a sample of water, were measured using the same tensimeter. The results, which are shown in Table III, indicate that resin 48-C-3-91 had overall flow characteristics closer to those of water than either of the resins from Monsanto, and that therefore it may be concluded that resin 48-C-3-91 would be least apt to inhibit the flow of epoxy coatings when compared with the two Monsanto resins.

In addition to a low weight average molecular weight, the coating additive of Example 1 (48-C-3-91) contains no low volatile organic compounds (VOC), since no VOC are used in its manufacture.

TABLE I

Powder Coating Run-48-C-3-91

| Butyl Acrylate | 2-EHA | di-TBP | Total |
|---|---|---|---|
| 80 | 20 | 0.5 | 100.5 |
| 79.60199005 | 19.9005 | 0.497512 | 100 |
| | 1 Liter line out run | | |
| 796.0199005 | 199.005 | 4.975124 | 1000 |
| | 2 Liter line out run | | |
| 1592.039801 | 398.01 | 9.950249 | 2000 |
| Temp 410 F. | Residence Time | | |
| Pressure 120 psi | | 3.33 min | |

TABLE II

Physical Properties

| Sample | Resin No. | Wt. Average Mw | Tg°, C. | Viscosity, csp | Residual Monomer % |
|---|---|---|---|---|---|
| 48C-3-91 | 48C-3-91 | 5200 | −29.4 | 2940 | 0.046 |
| Modaflow Resin | N5F111 | 30000 | −30.3 | — | 0.035 |
| Modaflow 2100 | N5F006 | 10000 | −31 | — | 0.057 |
| Resiflo | PV88 | 17000 | −39.5 | — | 0 |
| Duplicate | 48c-3-121 | 5600 | — | | 0.14 |
| High Temp | 48c-3-127 | 5300 | — | | 0.11 |

TABLE III

| Sample | Advancing, dynes/cm | Receding, dynes/cm |
|---|---|---|
| Water | 65.87 | 70.55 |
| 48c-3-91 | 18 | 31 |
| Modaflo 2100 | 5.5 | 40 |
| Modaflo N5F111 | 3.55 | 32 |

Example 2

Optimization of Product Properties

Resin 48C-3-149 (Optimum Resin); Resin 48C-3-156; and Resin 48C-3-157.

A feed consisting of 77.5 parts BA, 22.5 parts of 2-EHA and 0.425 parts of di-TBP at a temperature of 210° C. (410° F.) was flowed into the reactor at the rate of 60 cc/min.

This procedure was later repeated twice for a total of three runs. The resins produced in Run 1, Run 2, and Run 3, were assigned lot numbers 48C-C-3-149, 48C-3-156, and 48C-3-157, respectively. Physical properties of the resin product of each run were measured and the results are reported in Table IV, as are the properties of several other resin products, prepared as reported below in subsequent examples.

The viscosities of the resin products in all three runs were in the range of 5300–5700 cps, with a conversion rate of 90% or more.

TABLE IV

Physical Properties of Experimental Design Resins

| Run Number | Lot Number | Reaction Temp ° C. | Butyl Acrylate parts by wt. | 2-EHA parts by wt. | di TBP parts by wt. | wt. Average Mw | Tg° C., Theo | ResMonomer parts by wt. | Viscosity, cps | # of Beads (1 = least, 10 = most) | Conv % |
|---|---|---|---|---|---|---|---|---|---|---|---|
| 1 | 48c-3-130 | 410 | 80 | 20 | 0.55 | 6800 | −60 | 1.96 | 1290 | 4 | 90 |
| 2 | 48c-3-133 | 410 | 80 | 20 | 0.55 | 6500 | −60 | 0.89 | 1380 | 4 | 90 |
| 3 | 48c-3-131 | 410 | 80 | 20 | 0.1 | 7300 | −61 | 2 | 2120 | 1 | 92 |
| 4 | 48c-3-137 | 410 | 85 | 15 | 1 | 5200 | −58 | 0.37 | 1680 | 10 | 60 |
| 5 | 48c-3-136 | 410 | 75 | 25 | 0.1 | 5800 | −63 | 2.25 | 1860 | 10 | 85 |
| 6 | 48c-3-138 | 410 | 85 | 15 | 0.55 | 5600 | −59 | 0.27 | 1980 | 10 | 73 |
| 7 | 48c-3-139 | 410 | 85 | 15 | 0.1 | 6700 | −60 | 1.44 | 2600 | 7 | 90 |
| 8 | 48c-3-134 | 410 | 75 | 25 | 1 | 5700 | −61 | 0.44 | 1380 | 7 | 96 |
| 9 | 48c-3-135 | 410 | 80 | 20 | 1 | 4800 | −60 | 0.41 | 1520 | 1 | 90 |
| 10 | 48c-3-132 | 410 | 75 | 25 | 0.55 | 9700 | −62 | 0.96 | 2380 | 1 | 90 |

TABLE IV-continued

Physical Properties of Experimental Design Resins

| Run Number | Lot Number | Reaction Temp ° C. | Butyl Acrylate parts by wt. | 2-EHA parts by wt. | di TBP parts by wt. | wt. Average Mw | Tg° C., Theo | ResMonomer parts by wt. | Viscosity, cps | # of Beads (1 = least, 10 = most) | Conv % |
|---|---|---|---|---|---|---|---|---|---|---|---|
| | | | | Reproducibility Study | | | | | | | |
| 3 | 48c-3-140 | 410 | 80 | 20 | 0.1 | 7400 | −61 | 4.94 | | | 85 |
| 5 | 48c-3-141 | 410 | 75 | 25 | 0.1 | 7900 | −63 | 2.8 | | | 84 |
| | | | | Thermal Polymerization | | | | | | | |
| 3 | 48c-3-142 | 410 | 80 | 20 | 0 | 15400 | −61 | 8 | 4800 | 1 | 70 |
| Optimum | 48c-3-149 | 410 | 77.5 | 22.5 | 0.425 | 5300 | −62 | 5.2 | 675 | 1 | 96 |
| #5, 60 cc/min | 48c-3-151 | 410 | 75 | 25 | 0.1 | 6400 | −63 | 13.4 | 370 | Y | 93 |
| #5, 20 cc/min | 48c-3-152 | 410 | 75 | 25 | 0.1 | 6400 | −63 | 12.1 | 395 | Y | 93 |
| #5, 15 cc/min | 48c-3-153 | 410 | 75 | 25 | 0.1 | 7200 | −63 | 11.3 | 495 | Y | 97 |
| #3, 60 cc/min | 48c-3-154 | 410 | 80 | 20 | 0.1 | 6800 | −61 | 11 | 490 | Y | 92 |
| #3, 20 cc/min | 48c-3-155 | 410 | 80 | 20 | 0.1 | 6800 | −61 | 11.1 | 425 | Y | 94 |
| Opt redone | 48c-3-156 | 410 | 77.5 | 22.5 | 0.425 | 5800 | −62 | 1.81 | 1260 | Y | 90 |

Example 3

Production of Resin 48C-3-131 and Resin 48-C-140

A feed consisting of 80 parts BA, 20 parts 2-EHA, and 0.1 parts of di-TBP at a temperature of 210° C. (410° F.) was flowed through the reactor at the rate of 60 cc/min. The experiment was later reproduced. The resins produced in the two runs were assigned lot numbers 48C-3-131 and 48-C-3-140, respectively. The physical properties of the resins were measured and results are shown above in Table IV.

Each resin product of Example 3 had a weight average molecular weight in the 7300–7400 range, and therefore each one should have desirable flow characteristics. In addition, the resin products of Example 3 contained no volatile organic compounds (VOC), since no VOC's were used in their manufacture.

Example 4

Production of Resin 48C-3-142:By Thermal Polymerization (i.e. Without Use of a Polymerization Initiator)

In this Example, a resin product was made from a feed consisting of 80 parts BA and 20 parts 2-EHA. The feed, preheated to a temperature of 210° C. (410° F.), was flowed through the reactor at the rate of 60 cc/min. The resin produced was assigned number 48C-3-142, and had a weight average molecular weight of about 15,400, which is unacceptably high.

Examples 6–16

Ten Resins Numbered Consecutively from 48C-3-130 through 48C-3-139

In each of Examples 6–16, a molten resin product was made from a feed consisting of parts of BA, 2 EHA and di-TBP as specified below in Table V. In each Example, the devolatilized molten resin product (i.e. end product) was analyzed in order to determine its glass transition temperature (Tg), residual monomer content and gel sphere (bead) content. The results of the analysis are shown in Table V. Gel spheres (beads) in molten resin product are to be avoided. A product that has a very low gel sphere (bead) content is preferable to one having a higher gel sphere (bead) content, all other factors being equal.

TABLE V

| Run Number | Lot Number | Reaction Temp | Butyl Acrylate | 2-EHA | di TBP wt. avg. | Mw | Tg ° C., Theo | Residual Monomer wt. % | Viscosity cps | # of Beads (1 = least, 10 = most) | Conv, % |
|---|---|---|---|---|---|---|---|---|---|---|---|
| 1 | 48c-3-130 | 410 | 80 | 20 | 0.55 | 6800 | −60 | 1.96 | 1290 | 4 | 90 |
| 2 | 48c-3-133 | 410 | 80 | 20 | 0.55 | 6500 | −60 | 0.89 | 1380 | 4 | 90 |
| 3 | 48c-3-131 | 410 | 80 | 20 | 0.1 | 7300 | −61 | 2 | 2120 | 1 | 92 |
| 4 | 48c-3-137 | 410 | 85 | 15 | 1 | 5200 | −58 | 0.37 | 1680 | 10 | 60 |
| 5 | 48c-3-136 | 410 | 75 | 25 | 0.1 | 5800 | −63 | 2.25 | 1860 | 10 | 85 |
| 6 | 48c-3-138 | 410 | 85 | 15 | 0.55 | 5600 | −59 | 0.27 | 1980 | 10 | 73 |
| 7 | 48c-3-139 | 410 | 85 | 15 | 0.1 | 6700 | −60 | 1.44 | 2600 | 7 | 90 |
| 8 | 48c-3-134 | 410 | 15 | 25 | 1 | 5700 | −61 | 0.44 | 1380 | 7 | 96 |
| 9 | 48c-3-135 | 410 | 80 | 20 | 1 | 4800 | −60 | 0.41 | 1520 | 1 | 90 |
| 10 | 48c-3-132 | 410 | 75 | 25 | 0.55 | 9700 | −62 | 0.96 | 2380 | 1 | 90 |

Example 17

A Study to Determine the Amount of Unreacted Monomer Contained in the Volatiles Removed During Devolatization In this Example a study was made to determine the composition of the volatile materials that were removed from the reaction products. Four resin products, 48C-3-121; 48C-3-140; 48C-3-141 and 48C-3-142, were prepared and the volatiles that were removed during the devolatalization step were collected and analyzed. The results of the study are shown below in Table VI. The study demonstrated that 59%–95% of the volatile material consisted of a mixture of the two monomers (BA and 2-EHA). This indicates that it would be cost effective to charge these volatiles into the continuous tube reactor as a part of the feedstock.

TABLE VI

| Sample | Lot # | Butyl Acrylate part by wt. | 2-Ethyl Hexyl Acrylate parts by wt. | Water | Un-knowns | Total |
|---|---|---|---|---|---|---|
| reprod | 48c-3-121 | 48 | 11 | 1 | 40 | 100 |
| #3 | 48c-3-140 | 58.5 | 8.1 | 0 | 33.4 | 100 |
| #5 | 48c-3-141 | 60.2 | 15.2 | 0 | 24.6 | 100 |
| #3 | 48c-3-142 | 81.5 | 13.5 | 0 | 5 | 100 |

Examples 18–27

Resins Made using Tert-butyl Hydroperoxide (tert-BHP as the Initiator

Details relating to the making of the resins of Examples 18–27 are reported in Table VII below.

Ten resins were made from a feed consisting of 80 part BA, 20 parts 2-EHA, and specified parts of tert-BHP. The parts by weight of tert-BHP used in each example were within in the range from 0.18–0.52. The weight average MWt (Mw) and number average MWt (Mn) of each resin were determined. The polydispersity (i.e. ratio Mw:Mn) was then calculated. The weight average MWt of each resin was in the range of 3,653 to 14,600. All ten of the design resins were deemed suitable for use as flow control additives for epoxy coating systems. Of particular note are the flow control additives of Example 20, Example 22, and Example 25, because these additives had molecular weights of 4,280, 3,653, and 5,030, respectively.

CONCLUSIONS

The resin products of the invention and in particular poly(butylacrylate-co-2-ethylhexylacrylate) resin products of the invention, made by the claimed process, are new and are useful as flow control additives for epoxy and other coating systems. These resins can be made without the use of solvent but, of course, solvent can be added. Resins of the invention have weight average molecular weights that are less than 10,000 and are less than the weight average molecular weights of prior art polyacrylate resins, and therefore are particularly useful.

What is claimed is:

1. A bulk polymerization process for preparing poly (butylacrylate-co-2-ethylhexylacrylate), which comprises the steps of:
   (a) charging into a continuous tube reactor, feedstock comprising butyl acrylate, 2-ethylhexyl acrylate, and a polymerization initiator;
   (b) maintaining a flow rate through the reactor and a reaction temperature in the reactor sufficient to provide a residence time of the feedstock in the reactor during which polymerization will occur, to form a resin mixture in the reactor;
   (c) maintaining a pressure in said reactor of about 80 psig to about 200 psig;
   said resulting resin mixture comprising poly (butylacrylate-co-2-ethylhexylacrylate) and unreacted monomer; and
   (d) devolatilizing said resin mixture exiting the reactor to remove unreacted monomers to provide substantially monomer-free poly(butylacrylate-co-2-ethylhexylacrylate) upon cooling.

2. The process of claim 1 further comprising recycling the unreacted monomers recovered during the devolatilization step and charging them into the continuous tube reactor as a part of the feedstock.

3. The process of claim 2 wherein the recycled monomers comprise at least about 5 weight percent of the feedstock.

4. The process of claim 1 wherein the residence time in the reactor is from about 2 minutes to about 10 minutes.

5. The process of claim 4 wherein the reaction temperature in said reactor is in the range from about 100° C. to about 300° C.

6. The process of claim 1 wherein the initiator is a peroxide or a hydroperoxide, and is employed at about 0.1 wt. % to about 1 wt. % with respect to said feedstock.

7. The process of claim 1 wherein the polymerization initiator is selected from the group consisting azo-bis isobu-

TABLE VII

Powder Coating Additives Data and Analysis

| EXAMPLE # | SAMPLE # | MONOMER RATIO (%) BA parts by wt. | 2-EHA parts by wt. | INITIATOR parts by wt. | INITIATOR USED | TEMP (C.) | AVG P (PSI) | RT (MIN) | MW wt. avg | PD |
|---|---|---|---|---|---|---|---|---|---|---|
| 18 | 118C-1-106-2 | 80 | 20 | 0.36 | TERT BUTYL HYDROPEROXIDE | 150 | 150 | 5.5 | 8770 | 6.2 |
| 19 | 118C-1-107-5 | 80 | 20 | 0.26 | TERT BUTYL HYDROPEROXIDE | 175 | 150 | 5.5 | 6860 | 4.5 |
| 20 | 118C-1-110-2 | 80 | 20 | 0.36 | TERT BUTYL HYDROPEROXIDE | 150 | 150 | 5.5 | 4280 | 3.4 |
| 21 | 118C-1-111-2 | 80 | 20 | 0.18 | TERT BUTYL HYDROPEROXIDE | 175 | 150 | 5.5 | 6430 | 5.5 |
| 22 | 118C-1-116-1 | 80 | 20 | 0.36 | TERT BUTYL HYDROPEROXIDE | 150 | 150 | 3.5 | 3653 | 2.9 |
| 23 | 118C-1-116-2 | 80 | 20 | 0.36 | TERT BUTYL HYDROPEROXIDE | 150 | 125 | 5.5 | 10181 | 7.9 |
| 24 | 118C-1-117 | 80 | 20 | 0.52 | TERT BUTYL HYDROPEROXIDE | 140 | 125 | 5.5 | 9177 | 7 |
| 25 | 118C-1-147-1 | 80 | 20 | 0.36 | TERT BUTYL HYDROPEROXIDE | 150 | 150 | 4.2 | 5030 | 3.6 |
| 26 | 118C-1-147-2 | 80 | 20 | 0.36 | TERT BUTYL HYDROPEROXIDE | 165 | 150 | 4.2 | 6810 | 5.3 |
| 27 | 118C-1-148 | 80 | 20 | 0.39 | TERT BUTYL HYDROPEROXIDE | 150 | 150 | 5.5 | 14600 | 9.19 | tyronitrile (AIBN), 1-tert-amylazo-1-cyanocylohexane, 1-tert-butylazo-1-cyanocyclohexane, tert-butylperoctate, tert-butylperbenzoate, cumene hydroperoxide, dicumyl peroxide, tert-butyl hydroperoxide, di-tert-butyl peroxide, di-tert amyl peroxide, and tert-butyl hydroperoxide (tert-BHP).

8. A solvent-free resin produced by the process of claim 1.

9. The process of claim 1 wherein the feedstock comprises about 75 wt. % to about 85 wt. % butyl acrylate, and about 15 wt. % to about 25 wt. % 2-ethylhexyl acrylate.

10. The process of claim 1 wherein the feedstock comprises about 77.5 wt. % butyl acrylate, about 22.5 wt. % 2-ethylhexyl acrylate, and about 0.4% di-tertiary butyl peroxide polymerization initiator based on monomer.

11. The process of claim 9 wherein the polymerization initiator comprises tert-butyl hydroperoxide.

12. A bulk polymerization process for preparing substantially solvent-free poly(butylacrylate-co-2-ethylhexylacrylate), which comprises the steps of:
   (a) charging into a continuous tube reactor, feedstock consisting essentially of butyl acrylate, 2-ethylhexyl acrylate and polymerization initiator.
   (b) maintaining a flow rate through the reactor sufficient to provide a residence time of the feedstock in the reactor of from about 2 min. to about 10 minutes,
   (c) maintaining a pressure in the reactor of about 80 psig to about 200 psig;
   (d) maintaining the resulting resin at a temperature within the range from about 149° C. (300° F.) to about 288° C. (550° F.) to form a product comprising poly(butylacrylate-co-2-ethylhexylacrylate) and unreacted monomer; and
   (e) devolatilizing said product exiting the reactor to remove unreacted monomers to provide a solvent-free poly(butylacrylate-co-2-ethylhexylacrylate) resin.

13. The process of claim 12 wherein said feedstock consists essentially of about 75 wt. % to about 85 wt. % butyl acrylate, and about 15 wt. % to about 25 wt. % of 2 ethylhexyl acrylate.

14. The process of claim 12 wherein said polymerization initiator is selected from the group consisting of di-tert-butyl peroxide, di-tert-anyl peroxide, and tert-butyl hydroperoxide.

15. Solvent-free poly(butylacrylate-co-2-ethylhexylacrylate), produced by the process of claim 12.

16. Poly(butylacrylate-co-2-ethylhexylacrylate), produced by the process of claim 11, wherein said poly(butylacrylate-co-2-ethylhexylacrylate) contains less than about 3% monomer.

17. A bulk polymerization process for preparing substantially solvent-free poly(butylacrylate-co-2-ethylhexyl acrylate), which comprises the steps of:
   (a) charging into a continuous tube reactor, feedstock consisting essentially of about 80 parts by weight butyl acrylate, about 20 parts by wt. 2-ethylhexyl acrylate and about 0.1–0.4 parts by weight tert-butyl hydroperoxide.
   (b) maintaining a flow rate through the reactor sufficient to provide a residence time of the feedstock in the reactor of from about 2 minutes to about 10 minutes;
   (c) maintaining a pressure in said reactor of about 100 psig to about 200 psig;
   (d) maintaining the resulting resin product at a temperature within the range from about 150° C. to about 300° C. with a heat transfer medium to form a resin product comprising poly(butylacrylate-co-2-ethylhexylacrylate) and unreacted monomer; and
   (e) devolatilizing said resin product exiting the reactor to remove unreacted monomers to provide a solvent-free poly(butylacrylate-co-2-ethylhexylacrylate) resin, whereby said resin is capable of forming clear coatings when used in combination with epoxy coating compositions.

18. Solvent free poly(butylacrylate-co-2-ethylhexylacrylate), produced by the process of claim 12.

19. Solvent free poly(butylacrylate-co-2-ethylhexylacrylate), produced by the process of claim 13.

20. Solvent free poly(butylacrylate-co-2-ethylhexylacrylate), produced by the process of claims 14.

21. The polymerization process of claim 1, comprising maintaining said pressure in said reactor at a pressure above the vapor pressure of said feedstock.

22. The process of claims 21, wherein said devolatilizing step is carried out by discharging said resin mixture from said reactor.

23. The polymerization process of claim 12, comprising maintaining said pressure in said reactor at a pressure above the vapor pressure of said feedstock.

24. The polymerization process of claim 23, wherein said volatilizing step is carried out by discharging said resin mixture from said reactor.

25. The polymerization process of claim 17, comprising maintaining said pressure in said reactor at a pressure above the vapor pressure of said feedstock.

26. The polymerization process of claim 25, wherein said devolatilizing step is carried out by discharging said resin mixture from said reactor.

* * * * *